United States Patent [19]

Pullukat et al.

[11] Patent Number: 4,524,141

[45] Date of Patent: Jun. 18, 1985

[54] POLYMERIZATION CATALYSTS AND METHODS

[75] Inventors: Thomas J. Pullukat, Hoffman Estates, Ill.; Yu-Tang Hwang, Clinton, Iowa; Robert A. Dombro, Palatine, Ill.

[73] Assignee: Chemplex Company, Rolling Meadows, Ill.

[21] Appl. No.: 487,454

[22] Filed: Apr. 21, 1983

[51] Int. Cl.$^3$ ............ C08F 4/02; C08F 4/62; C08F 4/64; C08F 4/68

[52] U.S. Cl. .................... 502/107; 502/116; 502/117; 502/120; 502/124; 526/128

[58] Field of Search ........... 502/104, 116, 117, 118, 502/120, 124, 107

[56] References Cited

U.S. PATENT DOCUMENTS

| | | | |
|---|---|---|---|
| 2,981,725 | 4/1961 | Luft et al. | 260/93.7 |
| 3,094,568 | 6/1963 | Hay et al. | 502/117 X |
| 3,654,249 | 4/1972 | Diedrich et al. | 260/88.2 |
| 3,759,884 | 9/1973 | Tokozumi et al. | 260/88.2 R |
| 4,039,472 | 8/1977 | Hoff | 252/429 C |
| 4,082,692 | 4/1978 | Goldie | 252/429 B |
| 4,097,409 | 6/1978 | Speakman | 252/429 R |
| 4,374,753 | 2/1983 | Pullukat et al. | 502/169 |

FOREIGN PATENT DOCUMENTS

| | | |
|---|---|---|
| 2068007A | 8/1981 | United Kingdom . |
| 2099834A | 12/1982 | United Kingdom . |
| 2068007B | 6/1983 | United Kingdom . |

Primary Examiner—Patrick Garvin
Attorney, Agent, or Firm—Wood, Dalton, Phillips, Mason & Rowe

[57] ABSTRACT

A catalyst and method in which the catalyst is active with a cocatalyst in the polymerization and copolymerization of 1-olefins and is prepared by reacting together one or more of a specific class of organic silicon compounds, a porous support or a silicon compound treated porous support, a Group IIA organometallic compound, and a Group IVB, VB transition metal compound or mixture thereof.

31 Claims, No Drawings

POLYMERIZATION CATALYSTS AND METHODS

BACKGROUND OF THE INVENTION

The polymerization and copolymerization of 1-olefins rapidly and economically with a catalyst was primarily initiated by K. Ziegler who developed two component catalyst systems based on compounds of the Group IV-VIB metals of the periodic table with an organometallic compound of Groups I-IIIA of the periodic table. These catalysts efficiently promoted the polymerization and copolymerization of olefins. Since this discovery, numerous catalysts have been developed as improvements over the original Ziegler catalysts.

Although these later developments based on the original work by Ziegler produced in many instances superior catalysts, none have the improved properties and characteristics achieved with the catalysts of the present invention.

The catalysts of this invention are defined as follows:

A solid catalyst for use with an organometallic cocatalyst in the polymerization and copolymerization of 1-olefins, prepared by reacting:
(A) a support having surface hydroxyl groups and comprising
  (1) silica, alumina or silica-alumina or mixtures of these, or
  (2) an organosilane treated support of (A-1) or mixtures of these;
(B) an organosilicon compound of the formula $(R_3Si)_2NH$, where R is a hydrocarbyl group selected from $C_1$-$C_{20}$ alkyls, aryls, alkaryls or aralkyls or mixtures of these;
(C) a Group IIA organometallic compound or a complex of said Group IIA compound with a Group IIIA organometallic compound; and
(D) a transition metal compound of a Group IVB, Group VB or mixtures of these metals; or
(C') the Group IIA organometallic compound or complex of step (C) is reacted with the product of step (A-2) prior to the reaction of step (B).

The catalysts of this invention have very high activity and produce polymers which do not require a catalyst removal step. The catalysts of the invention are free flowing and produce polymers with good particle nature. The polymers made by using the new catalysts described herein have narrower molecular weight distribution and lower elasticity than polymers produced by prior art catalysts. The specific organic silicon compounds of this invention interact with or on the catalyst active sites and modify the catalyst's electronic structure resulting in the following unusual polymer properties. Polymers with lower elasticity and narrower molecular weight distribution are prepared and can be used to produce high strength objects such as blown films. This is highly important especially in the production of blown films from the ethylene-α-olefin copolymers currently manufactured under the commonly used term, linear low density polyethylene (LLDPE).

The catalysts also can be used to produce polymers with higher melt index than prior art catalysts. Polymers with high melt index and narrow molecular weight distribution permit the production of exceptionally tough and stiff products with faster production cycle.

SUMMARY OF THE INVENTION

This invention relates to improved supported catalysts and their preparation, and methods for the polymerization and copolymerization of olefins. The catalysts are made by combining in the presence or absence of an inert liquid media, a porous support or a silicon compound treated porous support, any of a specific class of organic silicon compounds, a Group IIA organometallic compound uncomplexed or complexed with a Group IIIA organometallic compound and a Group IVB, VB, or both transition metal compound. The solid catalyst obtained is activated with an alkylaluminum cocatalyst.

The porous support is either silica, alumina or both or silicon compound treated silica, alumina or both. The silicas or aluminas that are suitable for this invention may contain minor amounts of zirconia, magnesia or titania. Reaction of the support with an organic silicon compound of the formula $(R_3Si)_2NH$, where R is a hydrocarbyl group is an important variation in producing the catalysts of this invention. After reaction with the silicon compound, a Group IIA organometallic compound is added followed by a Group IVB, VB or mixture thereof transition metal compound. The catalysts are suitable for gas phase, particle form, solution form, or high pressure low density processes. The polymers made by this catalyst do not need a post reaction step to remove the catalyst residues, although such may be done if desired. In a particle form process, the polymers are particulate in nature and do not show fouling tendencies compared to prior art catalysts.

The catalysts of this invention are highly active and are suitable for polymerization of ethylene alone, and the copolymerization of ethylene with 1-olefins of 3-8 carbon atoms or mixtures to form polymers of low, medium and high densities. These catalysts are especially effective in the production of high and low density polyethylene having a narrow molecular weight distribution and high melt index.

The melt index of the polyethylene produced by the catalysts of this invention can be controlled by methods known to the art such as increasing the temperature of polymerization or by the addition of hydrogen.

DESCRIPTION OF PREFERRED EMBODIMENTS

The catalysts of this invention are prepared in two ways which differ in the pretreatment of the porous support. In one case, the support is not dried or calcined but is treated with sufficient organic silicon compound having functional groups to react with all hydroxyl groups present on the support. Following this all unreacted organic silicon compound and by-products are removed to give a free flowing silicon compound treated porous support.

In a second case, the support is dried or calcined. In this second case, an excess of a specific class of organic silicon compound over that required to react with the hydroxyl groups must be present as a part of the catalyst. Thus, a key critical feature is the presence of excess specific organic silicon compound added to an already completely silicon compound treated porous support or calcined porous support prior to or after the addition of a Group IIA organometallic compound followed by the Group IVB and/or VB transition metal compound.

The catalyst of this invention may be prepared in an inert liquid media, preferably hydrocarbons, straight or branched chain $C_3$ to $C_8$ aliphatic liquid hydrocarbons, including liquid propane, liquid isobutane, and mixed branched hydrocarbons such as Isopar H.

The porous support is selected from the group consisting of silica or alumina or mixtures thereof. It may contain minor amounts of zirconia, magnesia or titania such as a zirconia-silica cogel or a zirconia-titania-silica tergel. The preferred support is silica. The support is dried or calcined at temperatures in the range of from about 200° to 1000° C. Alternatively, the support is not dried and is treated with an organic silicon compound that reacts with the support hydroxyl groups. The organic silicon compounds used may have at least one of the following formulae:

$$(R_3Si)_2NH$$

$$RnSiX_{4-n}$$

where R is a hydrocarbyl group having from $C_1$ to $C_{20}$ carbon atoms including alkyls, aryls, alkaryls, aralkyls, etc. and may be the same or different; X is halogen; n = 1, 2 or 3. Examples are trimethylchlorosilane, hexamethyldisilazane, etc. The reaction with the organic silicon compound can be done in any convenient way, i.e., in solution, direct reaction with the support or under vapor phase conditions, etc. The excess organic silicon compound and reaction product are removed after reaction with the support.

The dried, calcined, or silicon compound treated support is then contacted with the specific organic silicon compound having the following structural formula:

$$(R_3Si)_2NH$$

where R is a hydrocarbyl group selected from $C_1$ to $C_{20}$ alkyls, aryls, alkaryls, aralkyls, etc. The R groups may be identical or different. Examples are hexamethyldisilazane, hexaphenyldisilazane, trimethyltriethyldisilazane, etc.

The addition of the specific organic silicon compound to the support or catalyst under preparation can be done in any convenient way, i.e., in slurry or in a fluidized or agitated state, said specific organic silicon compound being introduced as liquid, vapor or solution. It is added prior to or after the addition of the Group IIA organometallic compound. The quantity added is from 0.2 to 2.0 molar equivalents to the Group IIA organometallic compound. The preferred range is 0.5 to 1.5 molar equivalents of the specific organic silicon compound to the Group IIA organometallic compound.

The Group IIA organometallic compounds are preferably the hydrocarbyl derivatives of magnesium and calcium or their complexes with Group IIIA metal compounds, especially aluminum compounds such as alkyl aluminum compounds. Especially suitable are those of the general formula $MgR_2 \cdot nAlR_3$ where R is a hydrocarbyl group as defined above and n is about 0-2. Examples are n-butylethylmagnesium, 0.5 di-n-butyl-magnesium-triethylaluminum complex, and 6.1 di-n-butylmagnesium-triethylaluminum complex (Texas Alkyls' Magala 6.1E).

The concentration of the Group IIA organometallic compound may be equal to, greater than, or less than the porous supports original surface hydroxyl concentration and the molar ratio of magnesium compound to surface hydroxyl is about 0.1-5.

The Group IVB and/or VB transition metal compounds are halides or alkoxyhalides of these metals, with the preferred metal being titanium, zirconium or vanadium. The especially preferred titanium compounds may be selected from the following formulae:

$$TiX_4$$

$$TiX_m(OR)_{4-m}$$

in which X is halide, R is hydrocarbyl such as alkyl, aryl, etc., having from 1 to 20 carbon atoms and m is 1, 2 or 3. Examples are titanium tetrachloride, n-butoxytitanium trichloride, etc. The quantity of the transition metal compound is preferably in about a one to one molar ratio with the Group IIA organometallic compound. Lower or higher ratios can be used.

In many cases the activity of the reaction product is greatly increased by the addition of an organometallic cocatalyst, the metal preferably being aluminum, either prior to polymerization or simultaneously with the introduction of the catalyst to the polymerization vessel. It is preferred to use an alkylaluminum compound as a cocatalyst. The ratio of aluminum to transition metal may range from up to about 500 to 1, preferably about 1-50 to 1. Various alkylaluminum compounds function as cocatalysts, the preferred compounds depending upon the polymerization conditions. Typically, suitable compounds are triethylaluminum, trioctylaluminum, triisobutylaluminum, diisobutylaluminum hydride, tri(2-methyl pentyl)aluminum, diethylaluminum chloride, ethylaluminum dichloride, diethylaluminum ethoxide, diethylaluminum trimethylsiloxide, etc.

The catalysts of this invention may be used as dry solids, slurries, dispersions in hydrocarbon liquids, solutions or colloidal suspensions in hydrocarbon liquids.

Preparation of a catalyst of this invention is remarkably simple. All that is required is to mix the ingredients in a single vessel, in the preferred concentrations and if desired in the presence of an inert liquid media. The inert liquid media, if employed, is evaporated while heating to a final drying temperature of about 90°-130° C. The dry free flowing catalyst is transferred to a dry inert atmosphere filled container where it is stored for use. An in situ silanation of a dried or calcined support with excess specific organic silicon compound is one of the important features of the preparation. Another important feature is the presence of excess specific organic silicon compound added to a presilanated, preferably completely silanated, porous support prior to addition of the remaining components of the catalyst. In this case, no drying or calcination of the support prior to treatment with an organic silicon compound is necessary, since the support is already substantially free of water. However, the excess organic silicon compound plus by-products of the treatment must be removed prior to the addition of the remaining components of the catalyst.

To summarize, therefore, the catalyst of this invention is prepared by (1) reacting an excess of a specific organosilicon compound with a porous support essentially free of surface absorbed water, (2) reacting the product of (1) with a Group IIA organometallic compound or complex thereof with a Group IIIA organometallic compound and (3) reacting the product of (2) with a halide, oxyhalide, or alkoxyhalide of a metal of Group IVB or Group VB or mixtures of these. The solid catalyst product of (3) is used with a cocatalyst prior to and/or during the polymerization reaction.

The catalyst of this invention is also prepared by (1) reacting a porous support having surface absorbed water with excess organosilicon compound, (2) removing excess silicon compound and by-products from (1), (3) adding a specific organic silicon compound prior to or after mixing with a (4) Group IIA organometallic compound or complex with a Group IIIA organometallic compound and (5) reacting with a halide, oxyhalide, or alkoxyhalide of a metal of Group IVB or VB or mixtures of these. The solid catalyst product of (5) is used with an alkyl or arylaluminum compound cocatalyst prior to and/or during the polymerization reaction.

Efficient mixing of catalyst ingredients is done in a closed vessel, under pressure or at atmospheric pressure, under an inert atmosphere such as nitrogen, at temperatures from about 0° C. to 150° C. and with minimal hold periods between component additions. The presence of an inert liquid media aids in the mixing. After evaporation of the inert media, the dry product reaches a temperature between about 70° C. and 150° C. and is held for about one hour.

The sequence of mixing the components of the catalyst may be any of the following:
1. Silanated support or dried support followed by excess of the silicon compound, magnesium compound, and titanium compound.
2. Silanated support followed by the magnesium compound, silicon compound, and titanium compound.

When using the catalysts of this invention, at least one α-olefin of the formula $RCH=CH_2$, wherein R is hydrogen or a straight chain or branched alkyl group having from 1 to 10, preferably 1-8, carbon atoms, is polymerized. Examples of such olefins are ethylene, propylene, butene-1, hexene-1, 4-methyl pentene-1, and octene-1. Ethylene is polymerized alone or with mixtures of one or more of the above olefins.

The polymerization may be carried out in suspension, in the gas phase, or under solution conditions, continuously or discontinuously, at temperatures from about 20°–300° C., preferably from 60°–110° C., and under pressures preferably from about 100-30,000 psi.

The melt index of the polymers produced can be controlled by methods known to the art such as increasing the temperature of polymerization or by addition of hydrogen.

The polymers made by this invention show narrower molecular weight distribution, higher melt index, lower elasticity and high and low densities desirable for the production of high performance polymer grades.

The catalysts are useful for producing polymers of 1-olefins of 2–8 carbon atoms and copolymers of these with 1-olefins of 2–20 carbon atoms.

EXAMPLES

Comparative Example 1 and invention Examples 2 to 6 inclusive in Table I show that the catalysts of this invention are active and exhibit greater productivity, especially under low density copolymerization conditions, than supported catalysts not containing a silicon compound according to this invention, as shown in Example 1.

EXAMPLE 1

Table I (comparative)

A catalyst was prepared from Davison Chemical Company Grade 952 silica. The reactions were conducted in a dry, $N_2$ purged flask immersed in an ice water bath. First 3.3 g of the silica was added and the silica was stirred for thirty minutes at the low temperature. Then 20.8 ml of a $(Bu_2Mg)_{6.5}Et_3Al$ solution in heptane (10 wt.%) was added by syringe (1.46 g of complex). The mixture was stirred for 30 min. then 1.13 ml (1.92 g) of titanium tetrachloride was added. After an additional 30 min. at 0° C., the flask was placed in a bath at 90° C. and the solvent was evaporated under nitrogen flow. A portion of the catalyst was tested in a pressure vessel using isobutane diluent at a total pressure of 550 psig at 221° F. with a hydrogen partial pressure of 50 psig. TIBAL was added to give 9.2 mmoles/g of solid catalyst. The reactivity was found to be 2445 g/g cat/hr.

EXAMPLE 2

Table I (invention)

A catalyst was prepared by mixing under $N_2$, 1.5 g Davison Grade 952 silica, previously dried at 300° C., with 30 cc n-heptane and 0.39 cc (20 wt.% of the silica) of hexamethyldisilazane (in-situ silanation). This mixture was heated to 90° C. and stirred for one hour and then cooled. An 8.9 wt.% solution of $(Bu_2Mg)_{6.1}Et_3Al$ in n-heptane, 4.46 cc, was then added. After stirring this mixture for 0.5 hr., 0.22 cc of $TiCl_4$ was added followed by stirring for an additional 0.5 hr. Removal of the n-heptane diluent with $N_2$ at 90° C. resulted in a dry brown freeflowing catalyst powder. A portion of the catalyst was tested under similar conditions as described in Example 1, Table I, but with 8.5 mmoles/g catalyst of triisobutylaluminum as cocatalyst and at 215° F. The reactivity was found to be 3893 g/g cat/hr.

EXAMPLE 3

Table I (invention)

Hexamethyldisilazane treated Davison Grade 952 silica, 1.6 g, was dried in $N_2$ for one hour at 110° C. To the dry silane treated support was added 20 cc of n-heptane and 0.14 cc additional hexamethyldisilazane (7 wt.% of the support). This mixture was stirred for 10 min. followed by the addition of 4.75 cc of 8.9 wt.% $(Bu_2Mg)_{6.1}Et_3Al$ in n-heptane, stirring for an additional 10 min., and the addition of 0.22 cc titanium tetrachloride. The mixture was dried at 100° C. with a $N_2$ purge to yield a black free-flowing catalyst. Reactivity under conditions set forth in Example 2, Table I, was 2464 g/g cat/hr.

EXAMPLE 4

Table I (invention)

The catalyst of this example was prepared like the catalyst of Example 2, Table I, except for the concentration of ingredients. Thus, 1.5 g of Davison Grade 952 silica, dried at 300° C. in $N_2$, was mixed with 20 cc n-heptane and 0.39 cc of hexamethyldisilazane (in-situ silanation). The mixture was refluxed at 90° C. for one hour and then cooled. A solution of 8.9 wt.% $(Bu_2Mg)_{6.1}Et_3Al$ in n-heptane, 6.2 cc, was added and the mixture stirred 0.5 hr. Addition of 0.29 cc of titanium tetrachloride produced a dark brown product which was then freed of n-heptane by $N_2$ purge at 100° C. A free-flowing dark brown catalyst was obtained. A portion of this catalyst was tested under low-density copolymerization conditions in isobutane diluent, with 8.5 mmoles/g catalyst of triisobutylaluminum cocatalyst, at 160° F., with a partial pressure of 50 psig hydrogen, with 22 mol % butene-1 as comonomer and with ethylene fed on demand at 350 psig total reaction pressure. Exceptionally high reactivity of 4797 g/g cat/hr. was reached giving an ethylene- butene-1 copolymer with density 0.922 g/cc.

EXAMPLE 5

Table I (invention)

This catalyst is similar to that of Example 3, Table I, in that excess hexamethyldisilazane was added to an already silanated silica followed by the magnesium complex and the titanium compound. However, the catalyst was prepared on a larger scale by combining under $N_2$ in 1000 cc n-hexane, 200 g of the hexamethyldisilazane treated Davison Grade 952 silica, dried one hour at 100° C., with 18 cc additional hexamethyldisilazane (7 wt.% of the silanated silica support), 703 cc of a 10 wt.% solution of $(Bu_2Mg)_{7.1} Et_3Al$ in n-heptane and with 38.6 cc titanium tetrachloride. The mixture was stirred for one hour and then dried at 110° C. with $N_2$ purge for 20 hr. A black free-flowing catalyst remains. As in Example 4, Table I, testing was under low-density copolymerization conditions. Again, exceptionally high reactivity was reached at 5763 g/g cat/hr. The copolymer produced had a density of 0.916 g/cc indicating good incorporation of butene-1.

EXAMPLE 6

Table I (invention)

This catalyst is similar to the catalyst of Example 2, Table I, except that it was prepared on a one pound scale with 700° F. calcined Davison Grade 952 silica, in a closed vessel, with no hold periods or venting between component additions and in isobutane diluent. Thus, 455 g of 700° F. Davison Grade 952 silica was charged to a steel vessel under $N_2$ and the vessel sealed. About 4800 cc of isobutane was charged under pressure and the mixture agitated for 5 min. Heat was applied and the entire vessel vented to remove isobutane and all traces of oxygen from the support. The vessel was again closed and 48 cc of hexamethyldisilazane and 1400 cc isobutane was added at <150° F. with agitation followed immediately with 1180 cc of a 10.6 wt.% solution of $(Bu_2Mg)_{7.5}Et_3Al$ in n-hexane and 62 cc titanium tetrachloride. The remainder of the vessel was filled with 700 cc additional isobutane and the contents agitated at 195° F. for one hour. Venting with a $N_2$ purge while maintaining the temperature at about 195° F. provided a dry free-flowing brown catalyst which was transferred to a storage vessel under $N_2$.

This catalyst reached an exceptionally high productivity level of 16,500 g copolymer/g catalyst under low density particle form copolymerization conditions in isobutane at 168° F., 600 psig total pressure, 0.22 mol % hydrogen, 4 wt.% ethylene, 13.3 mol % butene-1 and with triisobutylaluminum at 3.7 mmoles/g catalyst. The copolymer obtained had a density of 0.924 g/cc.

Invention Examples 7-10 of Table II show that narrow molecular weight distribution ethylene homopolymers are produced at various concentrations of the silicon compound when used by the in situ silanation catalyst preparation invention method. Example 11, Table II, shows that the variation of the invention where excess silicon compound is added to an already silanated support followed by the magnesium and titanium compounds, also gives rise to resins with narrow molecular weight distribution. Example 12, Table II, shows that much lower catalyst activity results when a catalyst similar to the catalyst described in invention Example 8 is prepared without removing the physisorbed water from the support by calcination. Examples 13 and 14 of Table II demonstrate yet another variation of the invention catalyst where the magnesium compound is added first to the already silanated support followed by additional silicon compound and the titanium compound. These catalysts showed good activity in the production of hexene-1 copolymers. Comparative Example 15, Table II, shows that the absence of excess silicon compound gives rise to a catalyst which produces a copolymer, under similar synthesis conditions, with much lower melt index and higher HLMI/MI ratio.

EXAMPLE 7

Table II (invention)

A catalyst was prepared by mixing under $N_2$, 1.3 g of 400° F. calcined Davison Grade 952 silica with 20 cc n-hexane and 0.17 cc hexamethyldisilazane (0.62 mmoles/g support). After one hour, 3.86 cc of an 8.9 wt.% solution of $(Bu_2MG)_{6.1}Et_3Al$ in n-heptane was added followed in 0.5 hr. by 0.18 cc of titanium tetrachloride. The mixture was dried with $N_2$ purging at 90° C. to give a brown free-flowing catalyst. A portion of the catalyst was used in ethylene polymerization at 215° F. using triisobutylaluminum as a cocatalyst and a 50 psig partial pressure of hydrogen. The reactivity of the catalyst was 2156 g/g cat/hr. and the resin had a low HLMI/MI ratio of 29.6 indicating narrow molecular weight distribution.

EXAMPLE 8

Table II (invention)

A catalyst similar to the above example was prepared except that the concentration of hexamethyldisilazane was increased to 1.22 mmoles/g support. Ethylene polymerization in the presence of triisobutylaluminum showed a reactivity of 2266 g/g cat/hr. A low value for the HLMI/MI ratio (24.3) again indicated a narrow molecular weight distribution.

EXAMPLE 9

Table II (invention)

This catalyst is similar to Example 7, Table II, except that the concentration of hexamethyldisilazane was further increased to 1.83 mmoles/g support. Reactivity of the catalyst under similar conditions was 1002 g/g cat/hr. The HLMI/MI ratio was 26.2.

EXAMPLE 10

Table II (invention)

The final catalyst of this series was prepared with 2.47 mmoles/g hexamethyldisilazane. Reactivity was 1052 g/g cat/hr. Resin HLMI/MI ratio was 21.8 again indicative of narrow molecular weight distribution.

EXAMPLE 11

Table II (invention)

This catalyst is identical to that described in Example 3, Table I. Resin produced by this catalyst under homopolymer polymerization conditions has a low HLMI/MI ratio of 28.1 a value within the range of values determined on similar resins produced by the in-situ silanation catalyst preparation method.

EXAMPLE 12

Table II (comparative)

Much lower catalyst activity results when a catalyst similar to the catalyst described in invention Example 8, Table II, is prepared without removing the physisorbed water from the silica by calcination. Thus, 450 g of raw Davison Grade 952 silica was charged under $N_2$ to a steel vessel and sealed. All trace of air was then removed by alternatively pressurizing the vessel with $N_2$ and venting, five times. At 25° C., 130 cc of hexamethyldisilazane and 1500 cc of isobutane were charged, under pressure sufficient to liquify the isobutane, followed by agitation of the mixture for one hour. The reaction mixture was vented and then resealed. With agitation, 1180 cc of 10.6 wt. % $(Bu_2Mg)_{7.5}Et_3Al$ in n-hexane was added together with 1500 cc isobutane. After agitation for 0.25 hour, 62 cc of titanium tetrachloride and 1500 cc additional isobutane was pressurized into the vessel. This mixture was agitated for one hour at 212° F. followed by venting and drying with $N_2$ purging. The nearly white catalyst was dropped from the vessel into a $N_2$ filled dry container. With triisobutylaluminum as cocatalyst, this catalyst showed poor activity at 581 g/g cat/hr.

EXAMPLE 13

Table II (invention)

Under $N_2$, 1.7 g of dry hexamethyldisilazane treated Davison Grade 952 silica was mixed with 20 cc n-hexane and a 6.4 cc solution of 9 wt. % $(Bu_2Mg)_{7.1}Et_3Al$ in n-heptane. After 0.5 hour, 0.66 cc of hexamethyldisilazane was added followed by heating of the mixture at 90° C. for 0.5 hour and cooling. A solution of 0.35 cc titanium tetrachloride in 20 cc n-hexane was added followed by drying of the mixture at 90° C. with $N_2$ purge. A brown-green free-flowing powdered catalyst results. The copolymerization of ethylene with hexene-1 in the presence of hydrogen at 130° F., 265 psi and with triisobutylaluminum as cocatalyst gave a copolymer with density 0.930 g/cc, MI 4.7, and HLMI/MI ratio of 32. Activity was 2508 g/g cat/hr.

EXAMPLE 14

Table II (invention)

This catalyst was prepared as in Example 13, Table II, but with less silicon compound. Testing under similar copolymerization conditions gave a copolymer with 0.930 g/cc density, 2.9 MI, and HLMI/MI ratio of 29.4. Activity was 2519 g/g cat/hr.

EXAMPLE 15

Table II (comparative)

Under $N_2$, 1.7 g of dry hexamethyldisilazane treated Davison Grade 952 silica was mixed with 20 cc n-hexane and a solution of 6.4 cc 90 wt. % $(Bu_2Mg)_{7.1}Et_3Al$ in n-heptane. This mixture was stirred 0.5 hour followed by the addition of 0.35 cc titanium tetrachloride. The product was dried at 100° C. with $N_2$ purging. Testing under similar conditions gave a copolymer with 0.930 g/cc density, but with much lower MI and a much higher HLMI/MI ratio of 60.5.

Examples 16 and 17 of Table III compare, under particle form copolymerization conditions, a catalyst of this invention prepared by the in situ silanation method and a catalyst prepared from a completely silanated, but without excess silicon compound. Results show that the catalyst of this invention gave low-density resins with narrower molecular weight distribution (lower $R_d$) and higher notched Elmendorf tear strength (MD tear).

EXAMPLE 16

Table III (comparative)

450 g of hexamethyldisilazane treated Davison Grade 952 silica was dried at 110° C. for one hour and then charged under $N_2$ to a steel vessel and sealed. All traces of air were then removed by alternatively pressurizing the vessel with $N_2$ and venting, five times. With agitation, 1180 cc of 10.6 wt. % $(Bu_2Mg)_{7.5}Et_3Al$ in n-hexane was added together with 1500 cc isobutane. After mixing for one hour, 62 cc of titanium tetrachloride was added along with 1500 cc additional isobutane. This mixture was mixed for one hour at about 200° F. followed by venting and drying with $N_2$ purging. The brown product was transferred under $N_2$ to a $N_2$ filled vessel. With triisobutylaluminum as cocatalyst, this catalyst showed a productivity of 8300 g/g catalyst under particle form copolymerization conditions in isobutane diluent with hydrogen, ethylene, and butene-1 at 168° F. A copolymer with MI 0.8, $R_d$ 3.7, density 0.920 showed a notched Elmendorf machine direction tear strength of only 130 grams.

EXAMPLE 17

Table III (invention)

Davison Grade 952 silica was calcined at 1100° F. for 2 hr. 450 g was charged under $N_2$ to a steel vessel along with 4800 cc of isobutane. This mixture was agitated for 5 min. followed by venting to remove the isobutane along with all traces of air. The vent was closed and 52 cc of hexamethyldisilazane was added under pressure with 1450 cc of isobutane (in situ silanation). While agitating, 1202 cc of 10 wt. % $(Bu_2Mg)_{6.5}Et_3Al$ in n-heptane followed immediately by 62 cc titanium tetrachloride was added along with 1700 cc additional isobutane. Heat was applied to 195° F. where it was held for one hour. At the end of one hour, the vessel was vented under $N_2$ purge until the product was dry. The brown free-flowing catalyst was transferred to a $N_2$ filled flask. A portion of the catalyst was tested, with triisobutylaluminum as cocatalyst, under conditions similar to that described in Example 16, Table III. A copolymer with MI 0.7, lower $R_d$ 2.9, and a density of 0.919 g/cc was obtained at an exceptionally high productivity level of 12,500 g/g cat/hr. The notched Elmendorf machine direction tear strength was more than doubled at 274 grams.

Examples 18 and 19 of Table III compare, under particle form terpolymerization conditions, a catalyst of this invention and a catalyst prepared without the specific organic silicon compound. Results show that the catalyst of the invention gave low density 1-butene-1-hexene terpolymer with narrower molecular weight distribution (lower $R_d$) and higher melt index.

EXAMPLE 18

Table III (invention)

450 g of hexamethyldisilazane treated Davison Grade 952 silica was dried at 110° C. for one hour and then charged under $N_2$ to a steel vessel and sealed. All traces of air were then removed by charging the vessel with 4800 cc of isobutane, agitating the mixture, heating and then venting with $N_2$ purge. The vent is then closed and 2402 cc of 10 wt. % $(Bu_2Mg)_{6.5}Et_3Al$ in n-heptane was added with 300 cc of isobutane. The mixture was agitated at $\leq 150°$ F. for one hour. Hexamethyldisilazane, 165 cc, was then added along with 300 cc isobutane. After agitating for one hour, 124 cc of titanium tetrachloride was added with 400 cc additional isobutane. While agitating, the mixture was heated to 205° F. and held at that temperature for one hour. While maintaining the temperature as close as possible at 205° F., the vessel was vented to dry the catalyst. The dark brown free flowing product was transferred under $N_2$ to a $N_2$ filled vessel. With triisobutylaluminum as cocatalyst, this catalyst under particle form terpolymerization conditions in isobutane diluent with hydrogen, ethylene, 1-butene and 1-hexene at 165° F., produced a terpolymer resin with MI 1.0, $R_d$ 3.1 and density 0.918.

EXAMPLE 19

Table III (comparative)

This catalyst was prepared exactly as described in Example 16, Table III. An ethylene, 1-butene, 1-hexene terpolymer was produced under conditions described in Example 18. A terpolymer with MI 0.4, $R_d$ 5.6 and density 0.924 was produced.

TABLE I

CATALYST REACTIVITY AND PRODUCTIVITY

| Example # | Support[a] Calcination T, °F. | mmoles/g support | | | Reactor T, °F. | Reactor[b] Pressure psig | Cocatalyst[c] mmoles/ g catalyst | Wt. % $C_2H_4$ | Partial[d] Pressure psig $H_2$ | mol % $C_4H_8$—1 | Reactivity g/g cat/hr | Productivity g/g catalyst | Resin Density g/cc |
|---|---|---|---|---|---|---|---|---|---|---|---|---|---|
| | | Si[g] Compound | Mg Compound | $TiCl_4$ | | | | | | | | | |
| 1 | 392 | none | 0.5 | 3.0 | 221 | 550 | 9.2 | — | 50 | — | 2445 | 2,455 | — |
| 2 | 572 | 1.23 | 1.37 | 1.26 | 215 | 550 | 8.5 | — | 50 | — | 3893 | 3,893 | — |
| 3 | none[e] | 0.4[f] | 1.25 | 1.25 | 215 | 550 | 8.5 | — | 50 | — | 2464 | 2,464 | — |
| 4 | 572 | 0.7 | 1.9 | 1.8 | 160 | 350 | 8.5 | — | 50 | 22 | 4797 | 4,797 | 0.922 |
| 5 | none[e] | 0.4[f] | 1.25 | 1.25 | 160 | 350 | 8.5 | — | 50 | 22 | 5763 | 5,763 | 0.916 |
| 6 | 700 | 0.5 | 1.25 | 1.25 | 168 | 600 | 3.7 | 4 | 0.22[h] | 13.3 | — | 16,500 | 0.924 |

[a]Davison Grade 952 silica
[b]Polymerization of ethylene under particle form slurry conditions in isobutane at indicated total pressure with ethylene
[c]Triisobutylaluminum
[d]Partial pressure of hydrogen in psig
[e]Davison Grade 952 silica completely reacted with hexamethyldisilazane and dried at 110° C. in $N_2$ for one hour
[f]7 wt. % excess hexamethyldisilazane
[g]Hexamethyldisilazane
[h]Mol %

TABLE II

VARATIONS IN CATALYST PREPARATION

| Example # | Support[a] Calcination T, °F. | mmoles/g support | | | Reactor T, °F. | Reactor[b] Pressure psig | Cocatalyst[c] mmoles/ g catalyst | Wt. % $C_6H_{12}$—1 | Partial[d] Pressure psig $H_2$ | Reactivity g/g cat/hr | MI[e] | HLMI/MI[f] | Resin Density g/cc |
|---|---|---|---|---|---|---|---|---|---|---|---|---|---|
| | | Si[i] Compound | Mg Compound | $TiCl_4$ | | | | | | | | | |
| 7 | 400 | 0.62 | 1.36 | 1.26 | 215 | 550 | 8.5 | — | 50 | 2156 | 0.5 | 29.6 | — |
| 8 | 400 | 1.22 | 1.31 | 1.24 | 215 | 550 | 8.5 | — | 50 | 2266 | 0.6 | 24.3 | — |
| 9 | 400 | 1.83 | 1.36 | 1.24 | 215 | 550 | 8.5 | — | 50 | 1002 | 0.5 | 26.2 | — |
| 10 | 400 | 2.47 | 1.36 | 1.25 | 215 | 550 | 8.5 | — | 50 | 1052 | 2 | 21.8 | — |
| 11 | none[g] | 0.4[h] | 1.25 | 1.25 | 215 | 550 | 8.5 | — | 50 | 2464 | 1.3 | 28.7 | — |
| 12 | none[g] | 1.25 | 1.25 | 1.25 | 220 | 550 | 5.0 | | 0.08[l] | 581 | — | — | — |
| 13 | none[g] | 1.9[j] | 1.9 | 1.9 | 130 | 265 | 8.5 | 40 | 50 | 2508 | 4.7 | 32.0 | 0.930 |
| 14 | none[g] | 0.9[k] | 1.8 | 1.9 | 130 | 265 | 8.5 | 40 | 50 | 2519 | 2.9 | 29.4 | 0.930 |
| 15 | none[g] | none | 1.9 | 1.9 | 130 | 265 | 8.5 | 40 | 50 | 2405 | 1.0 | 60.5 | 0.930 |

[a]Davison Grade 952 silica
[b]Polymerization of ethylene under particle form slurry conditions in isobutane at indicated total pressure with ethylene
[c]Triisobutylaluminum
[d]Particle pressure of hydrogen in psig
[e]Melt index method: ASTM D 1238-62 condition E
[f]High load melt index method: ASTM D 1238-62 condition F
[g]Davison Grade 952 silica completely treated with hexamethyldisilazane and dried at 110° C. in $N_2$ for one hour
[h]7 wt. % excess hexamethyldisilazane
[i]Hexamethyldisilazane
[j]23 wt. % excess hexamethyldisilazane
[k]13 wt. % excess haxamethyldisilazane
[l]Mol %

TABLE III

CATALYST EVALUATION UNDER PARTICLE FORM POLYMERIZATION CONDITIONS

| Example # | Support[a] Calcination T, °F. | mmole/g support | | | Reactor T, °F. | Reactor Pressure psig | Cocatalyst[d] mmoles/ g support |
|---|---|---|---|---|---|---|---|
| | | Si[b] Compound | Mg[c] Compound | $TiCl_4$ | | | |
| 16 | none[i] | none | 1.25 | 1.25 | 168 | 600 | 0.9 |
| 17 | 1100 | 0.55 | 1.25 | 1.25 | 169 | 600 | 3.7 |
| 18 | none[i] | 1.75 | 2.50 | 2.50 | 155 | 600 | 2.0 |
| 19 | none[i] | 1.25 | 1.25 | 1.25 | 165 | 600 | 3.0 |

| Example | Wt. % | Mol % | Productivity | MD[h] Tear |

TABLE III-continued
CATALYST EVALUATION UNDER PARTICLE FORM POLYMERIZATION CONDITIONS

| # | $C_2H_4$ | $H_2$ | $C_4H_6$—1 | $C_6H_{12}$—1 | g/g catalyst | $R_d{}^e$ | $MI^f$ | $\rho^g$ | g |
|---|---|---|---|---|---|---|---|---|---|
| 16 | 4 | 0.2 | 12 | — | 8,300 | 3.7 | 0.8 | 0.920 | 130 |
| 17 | 3.5 | 0.3 | 14 | — | 12,500 | 2.9 | 0.7 | 0.919 | 274 |
| 18 | 4 | 0.2 | 1.8 | 2.4 | 130 | 3.1 | 1.0 | 0.918 | — |
| 19 | 4 | 0.04 | 9.8 | 2.6 | 22,000 | 5.6 | 0.4 | 0.924 | — |

[a] Davison Grade 952 silica
[b] Hexamethyldisilazane
[c] Di-n-butylmagnesium (7.5)/triethylaluminum
[d] Triisobutylaluminum
[e] Polymer Engineering and Science, Vol. II, p. 124–128 (1971)
[f] Melt index method: ASTM D 1238-62 condition E
[g] Density, g/cc
[h] Notched Elmendorf machine direction tear method: ASTM D-1922
[i] Davison Grade 952 silica completely reacted with hexamethyldisilazane and dried at 110° C. in $N_2$ for one hour

We claim:

1. A solid catalyst for use with an organometallic cocatalyst in the polymerization and copolymerization of 1-olefins prepared by the method comprising the steps of:
   (A) reacting a support comprising
      (1) silica, alumina, silica-alumina or mixtures of these having surface hydroxyl groups and dried or calcined at a temperature of at least about 200° C., or
      (2) silica, alumina, silica-alumina or mixtures of these having surface hydroxyl groups and reacted with an organosilane which is reactive with said groups followed by removal of any excess of said organosilane and reaction by-products, with
   (B) an excess relative to said hydroxyl groups of an organosilicon compound which is reactive with said hydroxyl groups of the formula $(R_3Si)_2NH$, where R is a hydrocarbyl group selected from $C_1$–$C_{20}$ alkyls, aryls, alkaryls, aralkyls or mixtures of these; and,
   (C) a Group IIA organometallic compound or complex of said Group IIA compound with a Group IIIA organometallic compound; followed by
   (D) a transition metal compound of a Group IVB, Group VB or mixtures of these metals; wherein said excess organosilicon compound of (B) is not removed prior to the addition of said transition metal compound of (D).

2. The catalyst of claim 1 wherein an inert liquid medium is present during said reaction.

3. The catalyst of claim 2 wherein said inert liquid comprises a liquid alkane.

4. The catalyst of claim 1 wherein said support is dried or calcined at a temperature from about 200° C. to about 1000° C. by heating.

5. The catalyst of claim 1 wherein said transition metal of 1(D) comprises titanium.

6. The catalyst of claim 1 wherein the amount of said transition metal compound of 1(D) is from 5–200 wt. % of the equivalent amount of said surface hydroxyl groups of 1(A).

7. The catalyst of claim 1 in combination with an organometallic cocatalyst wherein the ratio of the amount of metal in said cocatalyst to the amount of said transition metal of 1(D) is up to about 500 to 1.

8. The catalyst of claim 1 wherein said organosilane compound of 1(A-2) comprises one or more of said following compounds:

$$(R_3Si)_2NH$$

$$R_nSiX_{4-n}$$

where n is 1, 2 or 3, X is group chemically reactive with the hydroxyl groups of the silica or alumina, and R is hydrogen and/or hydrocarbyl.

9. The catalyst of claim 1 wherein said metal of Group IIA comprises magnesium.

10. The catalyst of claim 9 wherein said magnesium compound is of the formula $MgR_2.nAlR_3$ wherein R is a hydrocarbyl group and n=about 0–2.

11. The catalyst of claim 1 wherein said organometallic compound of 1(C) has a molar ratio to the hydroxyl groups of 1(A) of about 0.1–5.

12. The catalyst of claim 1 wherein said transition metal compounds of 1(D) comprise halides and alkoxy halides.

13. The catalyst of claim 12 wherein said metals comprise one or more of titanium, zirconium and vanadium.

14. The catalyst of claim 1 wherein said transition metal compound of 1(D) is one or more of the formulas:

$$TiX_4$$

$$TiX_m(OR')_{4-m}$$

in which m is 1, 2 or 3, R' is selected from alkyl, aryl, cycloalkyl, alkaryl, cyclopentadienyl and alkenyl, each of these groups having 1 to 12 carbon atoms, and X is halogen.

15. The catalyst of claim 1 wherein the support of (A) is reacted with the compound of (B), the resulting product is reacted with the compound or complex of (C), and the product thereof reacted with (D).

16. The catalyst of claim 1 wherein a compound of (B) is added to a support of (A-2) before or after mixing with a compound or complex of (C) and the resulting product reacted with a compound or mixture of (D).

17. The method of making a solid catalyst for use with an organometallic cocatalyst in the polymerization and copolymerization of 1-olefins, said method comprising the steps of:
   (A) reacting a support comprising
      (1) silica, alumina, silica-alumina or mixtures of these having surface hydroxyl groups and dried or calcined at a temperature of at least about 200° C., or
      (2) silica, alumina, silica-alumina or mixtures of these having surface hydroxyl groups and reacted with an organosilane which is reactive with said groups followed by removal of any excess of said organosilane and reaction by-products, with (B) an excess relative to said hydroxyl groups of an organosilicon compound which is reactive with said hydroxyl groups of the formula $(R_3Si)_2NH$, where R is a hydrocarbyl group selected from $C_1$-$C_{20}$ alkyls, aryls, alkaryls, aralkyls or mixtures of these; and, (C) a Group IIA organometallic compound or complex of said Group IIA compound with a Group IIIA organometallic compound; followed by (D) a transition metal compound of a Group IVB, Group VB or mixtures of these metals; wherein said excess organosilicon compound of (B) is not removed prior to the addition of said transition metal compound of (D).

18. The method of claim 17 wherein an inert liquid medium is present during said reaction.

19. The method of claim 18 wherein said inert liquid comprises a liquid alkane.

20. The method of claim 17 wherein said support is dried or calcined at a temperature from about 200° C. to about 1000° C. by heating.

21. The method of claim 17 wherein said transition metal of 20(D) comprises titanium.

22. The method of claim 17 wherein the amount of said transition metal compound of 20(D) is from 5–200 wt. % of the equivalent amount of said surface hydroxyl groups of 20(A).

23. The method of claim 17 wherein said organosilane compound of 20(A-2) comprises one or more of said following compounds:

$(R_3Si)_2NH$ $R_nSiX_{4-n}$ where n is 1, 2 or 3, X is a group chemically reactive with the hydroxyl groups of the silica or alumina, and R is hydrogen and/or hydrocarbyl.

24. The method of claim 17 wherein said metal of Group IIA comprises magnesium.

25. The method of claim 24 wherein said magnesium compound is of the formula $MgR_2 \cdot nAlR_3$ wherein R is a hydrocarbyl group and n=about 0–2.

26. The method of claim 17 wherein said organometallic compound of 20(C) has a molar ratio to the hydroxyl groups of 20(A) of about 0.1–5.

27. The method of claim 17 wherein said transition metal compounds of 20(D) comprise halides and alkoxy halides.

28. The method of claim 27 wherein said metals comprise one or more of titanium, zirconium and vanadium.

29. The method of claim 17 wherein said transition metal compound of 20(D) is one or more of the formulas:

$TiX_4$ $TiX_m(OR')_{(4-m)}$ in which, m is 1, 2, or 3, R' is selected from alkyl, aryl, cycloalkyl, alkaryl, cyclopentadienyl and alkenyl, each of these groups having 1 to 12 carbon atoms, and X is halogen.

30. The method of claim 17 wherein the support of (A) is reacted with the compound of (B), the resulting product is reacted with the compound or complex of (C), and the product thereof reacted with (D).

31. The method of claim 17 wherein a compound of (B) is added to a support of (A-2) before or after mixing with a compound or complex of (C) and the resulting product reacted with a compound or mixture of (D).

* * * * *

UNITED STATES PATENT AND TRADEMARK OFFICE
CERTIFICATE OF CORRECTION

PATENT NO. : 4,524,141
DATED : June 18, 1985
INVENTOR(S) : Pullukat et al

It is certified that error appears in the above-identified patent and that said Letters Patent is hereby corrected as shown below:

Column 15, lines 25 and 27, and column 16, lines 13 and 18, delete "20(D)" and substitute --17(D)-- therefore.

Column 15, line 29, and column 16, line 11, delete "20(A)" and substitute --17(A)-- therefore.

Column 15, line 31, delete "20(A-2)" and substitute --17(A-2)-- therefore.

Column 16, line 10, delete "20(C)" and substitute --17(C)-- therefore.

Signed and Sealed this

Seventeenth Day of February, 1987

*Attest:*

DONALD J. QUIGG

*Attesting Officer*     *Commissioner of Patents and Trademarks*